F. R. WOODWARD.
Rotary Paper Cutter.
No. 166,954.  Patented Aug. 24, 1875.
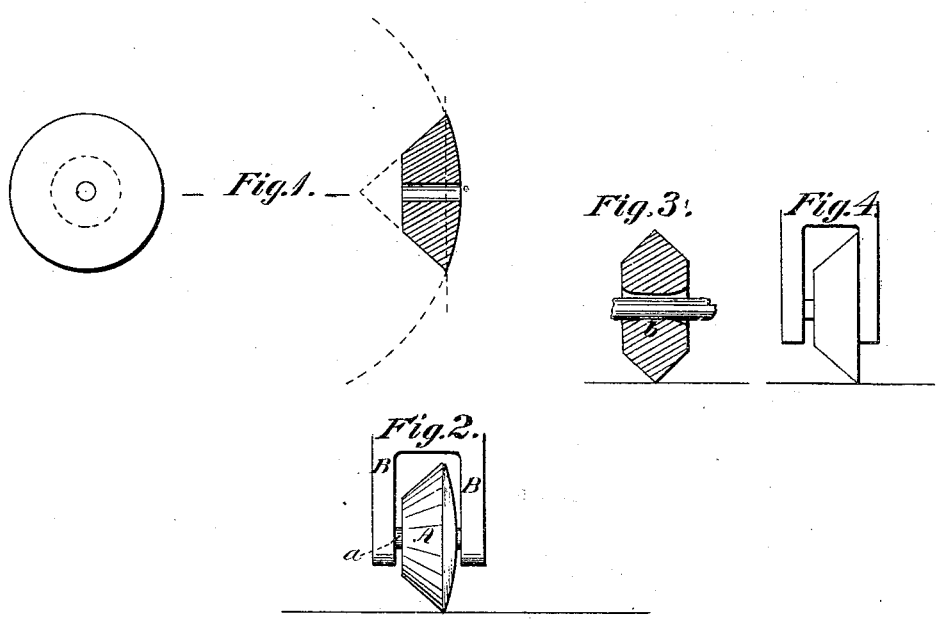

UNITED STATES PATENT OFFICE.

FRANK R. WOODWARD, OF HILL, NEW HAMPSHIRE.

IMPROVEMENT IN ROTARY PAPER-CUTTERS.

Specification forming part of Letters Patent No. 166,954, dated August 24, 1875; application filed March 5, 1875.

*To all whom it may concern:*

Be it known that I, FRANK R. WOODWARD, of Hill, in the county of Merrimack and State of New Hampshire, have invented an Improved Rotary Cutter for Cutting Paper, Leather, Pasteboard, Textile Fabrics, Vitreous Substances, &c., of which the following is a specification:

My invention relates to rotary steel cutters which are employed, when pivoted in a suitable handle, for cutting glass, textile fabrics, leather, pasteboard, paper, &c., by being rolled over these substances with a certain degree of pressure. Prior to my invention there were rotary cutters in use for cutting glass, which cutters had a V-shaped edge, the sides of the V being at right angles to each other, and of equal length. The central hole in these cutters, or the pin on which they turned, would wear away at the extremities in use, as shown at $b$, Fig. 3, in the annexed drawings, and the cutter would bear on the pin at its middle, and in this condition would rock or sway from one side to another with the least unsteadiness of the hand of the operator. This swaying of the cutter rendered it difficult to run it in a straight line, and thus the cutter was defective. Another particular which rendered such cutters ill adapted to the cutting of paper, pasteboard, leather, &c., was the great angle included between its inclined sides; the edge was too obtuse, and, besides preventing it from being run close alongside the edge of a pattern or ruler, spread the edges of the cut and rendered them rough and uneven.

Figure 1 is a front and transverse sectional view of my improved cutter. Fig. 2 is an edge view of the cutter pivoted in the handle. Fig. 3 is a sectional view of the cutters in use prior to my invention for cutting glass. Fig. 4 is an edge view of a cutter, the two sides of which are parallel, and its edge beveled from one side to the other.

In Fig. 1 is represented a cutter, which is the frustum of a cone, the base of which is convex. This convex surface is to obviate friction against the sides of the slot in the handle, in which the cutter is pivoted, as would be caused were the cutter of the shape represented at Fig. 4; but, instead of its being a curved surface, it may be conical. A, Fig. 2, is the cutter; B, a part of the handle; $a$, the pin on which the cutter rotates. In Fig. 3 is plainly seen the hole in the cutter worn away at its extremities, leaving the cutter to bear on the pin at its middle point. In my improved cutter the bearing is at one extremity of the hole, the curved side being mainly for the purpose of obviating friction, and the motion of the cutter will be uniform and without any swaying to and fro. It will also be perceived that in using my cutter it can be run close alongside the edge of the pattern or rule, and also that, the edge being acute, the edges of the cut will not be flaring or rough.

In cutting glass it is obvious that merely the edge of the cutter acts on the vitreous particles to separate them, the sides of the cutter having nothing to do with the operation; therefore my cutter may be employed for cutting vitreous substances.

My improved cutter is made of steel properly tempered and hardened, and then sharpened.

What I claim is—

In combination with a suitable handle, a rotary cutter for cutting textile fabrics, paper, pasteboard, leather, glass, &c., which in shape is the frustum of a cone, with a base slightly convex, so as to bring the bearing-point of the cutter on the pin, on which it turns, at one extremity of the hole in the cutter, and obviate friction against the side of the slot in the handle, in which the cutter is pivoted, substantially as described and specified.

FRANK R. WOODWARD.

Witnesses:
 E. H. JOHNSON,
 J. P. CRAWFORD.